United States Patent [19]
Mogi

[11] 3,898,475
[45] Aug. 5, 1975

[54] ENGINE START PROHIBITION SYSTEM
[75] Inventor: Takaaki Mogi, Fujisawa, Japan
[73] Assignee: Nissan Motor Company Limited, Yokohama, Japan
[22] Filed: Dec. 3, 1973
[21] Appl. No.: 420,905

[30] Foreign Application Priority Data
Dec. 4, 1972 Japan.............................. 47-138548
Mar. 2, 1973 Japan.............................. 48-25809

[52] U.S. Cl. ......... 307/10 SB; 340/52 E; 180/82 C; 340/278
[51] Int. Cl. ............................................. B60r 21/10
[58] Field of Search ................ 340/52 E, 52 R, 278; 307/10 SB; 180/82 C

[56] References Cited
UNITED STATES PATENTS
3,742,448   6/1973   Motz .............................. 340/52 E

*Primary Examiner*—Herman J. Hohauser

[57] ABSTRACT

This specification discloses an engine start prohibition system for a motor vehicle equipped with at least one safety harness. The engine start prohibition system comprises ignition switch means for producing a preparation signal and a motor start signal, a motor start gate circuit for passing therethrough the motor start signal when it is energized, a first energizing circuit for energizing the motor start gate when the safety harness is correctly set, a second energizing circuit for energizing the motor start gate when the engine is stopped while a person keeps seated on the operator seat or the preparation signal is generated by the ignition switch means, and motor start circuit for energizing the cranking motor of the motor vehicle when it is energized by the motor start signal passed through the motor start gate circuit.

5 Claims, 11 Drawing Figures

ENGINE START PROHIBITION SYSTEM

The present invention relates in general to safety devices and in particular is concerned with an engine start prohibition system for prohibiting the engine start of a motor vehicle equipped with at least one safety harness when the safety harness is not correctly set.

The conventional engine start prohibition system for a motor vehicle equipped with at least one safety harness is so arranged as to prohibit the engine to start as long as the safety harness is not correctly set. However, it is in practice desired that the engine start prohibition system allows the engine to start at an emergency such that the engine is unwantedly stopped at a railway crossing, even if the safety harness is not correctly set. Further, it is desirable to make disable the engine start prohibition system when the engine start prohibition system is in trouble.

It is accordingly a principal object of the present invention to provide a new and improved engine start prohibition system which allows the engine to start at an emergency even if the safety harness is not correctly set.

It is another object of the present invention to provide a new and improved engine start prohibition system which can be manually disabled.

According to the present invention, it has been found that the above objects are achieved by an engine start prohibition system for prohibiting the engine start of a motor vehicle equipped with at least one safety harness when the at least one safety harness is not correctly set, which comprises ignition switch means for producing a preparation signal and a motor start signal, motor start gate means for passing therethrough the motor start signal when energized, first energizing means for energizing the motor start gate means when the at least one safety harness is correctly set, second energizing means for energizing the motor start means when the engine is stopped while a person keeps seated on the operator seat or the ignition switch means produces the preparation signal, and motor start means for energizing the cranking motor of the motor vehicle when it receives the motor start signal passed through the motor start gate means.

For a full understanding of the invention, a detailed description in a preferred form will now be given in connection with the accompanying drawings and the features forming the invention will be specifically pointed out in the claims.

In the drawings:

FIGS. 3A through 4B are diagrams showing waveforms of signals appearing in the circuit arrangement of FIGS. 2A and 2B;

In the drawings, like reference characters are intended to refer to identical or similar elements throughout the several views.

Figure 1:
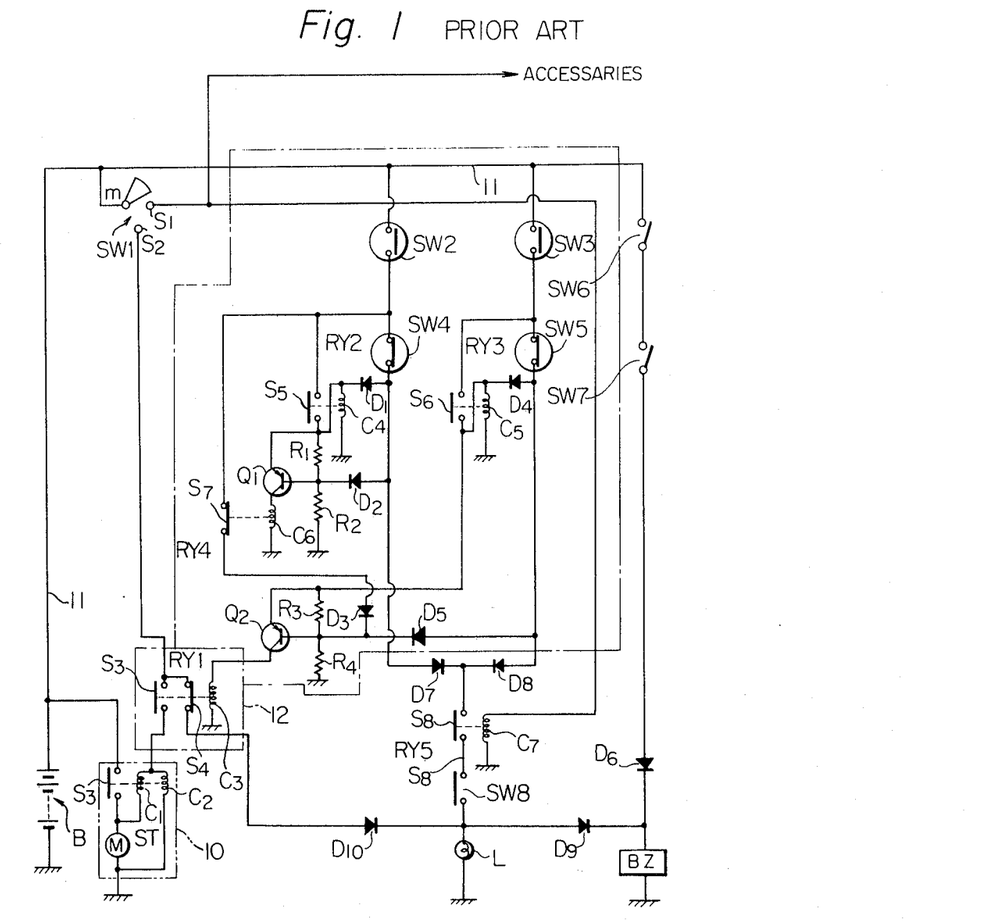
FIG. 1 is a diagram showing a circuit arrangement of a prior art engine start prohibition system.

Referring now to the drawings and more specifically to FIG. 1 thereof, there is illustrated a conventional engine start prohibition system for use with a motor vehicle equipped with at least one safety harness. The engine start prohibition system is composed of an ignition switch $SW_1$ of the motor vehicle and a motor start circuit 10 for energizing cranking motor when it is energized. The ignition switch $SW_1$ has a movable contace *contact* connected to a bus line which is connected to the other terminal of a d-c power source B, and two stationary contacts $s_1$ and $s_2$ associated with the movable contact $m$, the stationary contact $s_1$ being connected to accessories (not shown) installed in the motor vehicle. When it is intended to start the cranking motor M, the movable contact $m$ of the ignition switch $SW_1$ is actuated so as to contact with the stationary contact $s_2$, while the movable contact $m$ maintains to contact with the stationary contact $s_1$. For the simplicity of explanation, voltage signals appearing on the stationary contacts $s_1$ and $s_2$ are respectively referred to as "preparation signal" and "motor start signal" in this specification. The motor start circuit includes a relay ST having a pair of relay coils $c_1$ and $c_2$ and a normally-open relay switch $s_3$. One contact of the relay switch $s_3$ is connected to the bus line and the other contact is connected to one terminal of the cranking motor M the other terminal of which is grounded. The relay coil $c_1$ has its one terminal connected to the one terminal of the cranking motor M. The relay coil $c_2$ has its one terminal connected to the ground and its other terminal connected to the other terminal of the relay coil $c_1$.

The engine start prohibition system further comprises a motor start gate circuit 12 including a relay $RY_1$ with a relay coil $c_3$ and a normally-open relay switch $s_3$ and a normally-closed relay switch $s_4$. The relay coil $c_3$ has its one terminal grounded. The relay switch $s_3$ has its one terminal connected to the stationary contact $s_2$ and its other contact connected to the other terminal of the relay coil $c_1$. The relay switch $s_4$ has its one terminal connected to the one terminal of the relay switch $s_3$.

The engine start prohibition system further comprises a first energizing circuit for energizing the motor start gate circuit 12 which then energizes the motor start circuit 10. The energizing circuit generally includes normally-open switches $SW_2$ and $SW_3$, normally closed switches $SW_4$ and $SW_5$, relays $RY_2$, $RY_3$ and $RY_4$, and transistors $Q_1$ and $Q_2$. The normally-open switch $SW_2$ is adapted to close its circuit when a person is seated on the assistant seat and the normally-open switch $SW_3$ is adapted to close its circuit when a person is seated on the operator seat. The normally-closed switch $SW_4$ is adapted to open its circuit when a safety harness of the assistant seat is correctly set and the normally-closed switch $SW_5$ is adapted to open its circuit when a safety harness of the operator seat is correctly set. The normally-closed switch $SW_4$ has its one contact connected through the switch $SW_2$ to the bus line 11 and its other contact connected by way of a diode $D_1$ to one terminal of a relay coil $c_4$ of the relay $RY_2$ which is in turn grounded. The relay $RY_2$ has a normally-open relay switch $s_5$ with one contact connected through the switch $SW_2$ to the bus line 11 and the other contact connected to the one terminal of the relay coil $c_4$. The transistor $Q_1$ has its emitter connected to the other contact of the relay switch $s_5$ and its base connected through a diode $D_2$ to the other contact of the switch $SW_4$. The transistor $Q_1$ is incorporated with a bias circuit consisting of resistors $R_1$ and $R_2$. The collector of the transistor $Q_1$ is grounded through a relay coil $c_6$ of the relay $RY_4$. The relay $RY_4$ has a normally-closed relay switch $s_7$ with one contact connected through the switch $SW_2$ to the bus line 11 and the other contact connected through a diode $D_3$ to the base of the transistor $Q_2$ which has its collector grounded through the relay coil $c_3$. The transistor $Q_2$ is incorporated with a biasing circuit consisting of resistors $R_3$ and $R_4$. The relay $RY_3$ has a normally-open relay switch $s_6$ having its one contact connected to the emitter of the transistor $Q_2$ and its other contact connected through the switch $SW_3$ to the bus line 11. The relay coil $c_5$ of the relay $RY_3$ has its one terminal connected to the one contact of the relay switch $s_6$ and through a diode $D_4$ to one contact of the switch $SW_5$ the other contact of which is connected through the switch $SW_3$ to the bus line 11. The remaining terminal of the relay coil $c_5$ is grounded. The one contact of the switch $SW_5$ is connected by way of a diode $D_5$ to the base of the transistor $Q_2$.

The engine start prohibition system preferably further includes an alarm circuit which generally includes normally-open switches $SW_6$ and $SW_7$, a relay $RY_5$, a normally-open switch $SW_8$, a lamp L, and a buzzer BZ. The normally-open switch $SW_6$ is adapted to close its circuit when the steering is locked and the normally-open switch $SW_7$ is adapted to close its circuit when the doors of the motor vehicle are all shut. The normally-open switches $SW_8$ is adapted to close its circuit when the transmission gear is in any positions other than the neutral position. The buzzer BZ has one terminal connected through a diode $D_6$ and through a series connection of the switches $SW_6$ and $SW_7$ to the bus line 11, and the other terminal grounded. The relay $RY_5$ has a normally-open relay switch $s_8$ with one terminal connected through a diode $D_7$ to the switch $SW_4$ and through a diode $D_8$ to the switch $SW_5$ and the other contact connected to one contact of the switch $SW_8$. The relay $RY_5$ has a relay coil $c_7$ with one terminal connected to the stationary contact $s_1$ of the ignition switch $SW_1$ and the other contact grounded. The remaining contact of the switch $SW_8$ is connected to one terminal of the lamp L which is in turn grounded and is connected through a diode $D_9$ to the one terminal of the buzzer BZ. The remaining contact of the switch $SW_8$ is further connected to an anode of a diode $D_{10}$ the cathode of which is connected to the remaining contact of the normally-closed relay switch $s_4$ of the relay $RY_1$.

When, in operation, the movable contact of the ignition switch $SW_1$ is connected to the stationery contact $s_1$, the relay $RY_5$ is actuated and the accessories of the motor vehicle are also energized. When, in this instance, a person is seated on the operator seat without setting the safety harness, the switch $SW_3$ closes its circuit and the switch $SW_5$ is not actuated, so that the relay $RY_3$ is actuated by a current through the diode $D_4$ and held by a current through the thus closed relay switch $s_6$ and the relay coil $c_5$. Since, in this instance, both of the potential of the emitter and the base of the transistor $Q_2$ are equal to each other, the transistor $Q_2$ is rendered non-conductive. When the transmission gear is shifted to a position other than the neutral position, the switch $SW_8$ is actuated to close its circuit, with the result that the positive voltage is delivered by way of the switches $SW_3$ and $SW_5$, the relay switch $s_8$ and the switch $SW_8$ to the Lamp L which then glows. The positive voltage delivered to the lamp L is also applied by way of a diode $D_9$ to the buzzer BZ which then alarms. When, on the other hand, the movable contact of the ignition switch $SW_1$ is connected to the stationary switch $s_2$, the positive voltage is applied by way of the relay switch $s_4$ of the relay $RY_1$ and the diode $D_{10}$ to the lamp L and also the buzzer BZ, because the relay $RY_1$ is still not actuated. Of course, the motor start circuit 10 is not energized in this case, since the relay switch $s_3$ is still open.

If a person is seated on the operator seat after he sets the harness, then the relay $RY_3$ is not actuated, so that the transistor $Q_2$ is not rendered conductive and the relay $RY_1$ is not actuated. When, in this instance, intended to start the cranking motor M, the lamp L and the buzzer BZ are energized.

When a person is seated on the operator seat and thereafter set the safety harness, the potential at the base of the transistor $Q_2$ falls down thereby to render the transistor $Q_2$ conductive, whereby the relay $RY_1$ is actuated. When, in this instance, it is intended to start the cranking motor M, the positive voltage is delivered through the thus closed relay switch $s_3$ to the motor start circuit 10 whereby both the relay coils $c_1$ and $c_2$ are energized to actuate the relay switch $s_3$. The cranking motor M then starts to rotate. The relay switch $s_3$ is maintained only by the relay coil $c_2$ because the relay coil $c_1$ is de-energized due to an electro-motive force generated by the armature of the cranking motor M. In this instance, the relay switch $s_4$ opens its circuit and the lamp L and the buzzer BZ are not energized.

When another person is seated on the assistant seat without setting the safety harness of the assistant seat, the switch $SW_2$ is actuated to close its circuit while the switch $SW_4$ being not actuated, so that the relay $RY_2$ operates and holds by itself. Before the switch $SW_4$ is actuated, the transistor $Q_1$ is rendered non-conductive, so that the relay switch $s_7$ retains its closure thereby causing the transistor $Q_2$ to be non-conductive. When, in this state, the transmission gear is shifted to a position other than the neutral position or the movable contact m is connected to the stationary contact $s_3$, the lamp L and the buzzer BZ are energized. When, thereafter, the safety harness of the assistant seat is set, the switch $SW_4$ is actuated to open its circuit, so that the relay $RY_4$ is actuated thereby allowing the transistor $Q_2$ to become conductive due to the positive voltage passed through the relay switch $s_6$ of the relay $RY_3$. The conduction of the transistor $Q_2$ causes the relay $RY_1$ to operate thereby to allow the motor start signal to be exerted onto the motor start circuit 10.

Figure 2A:
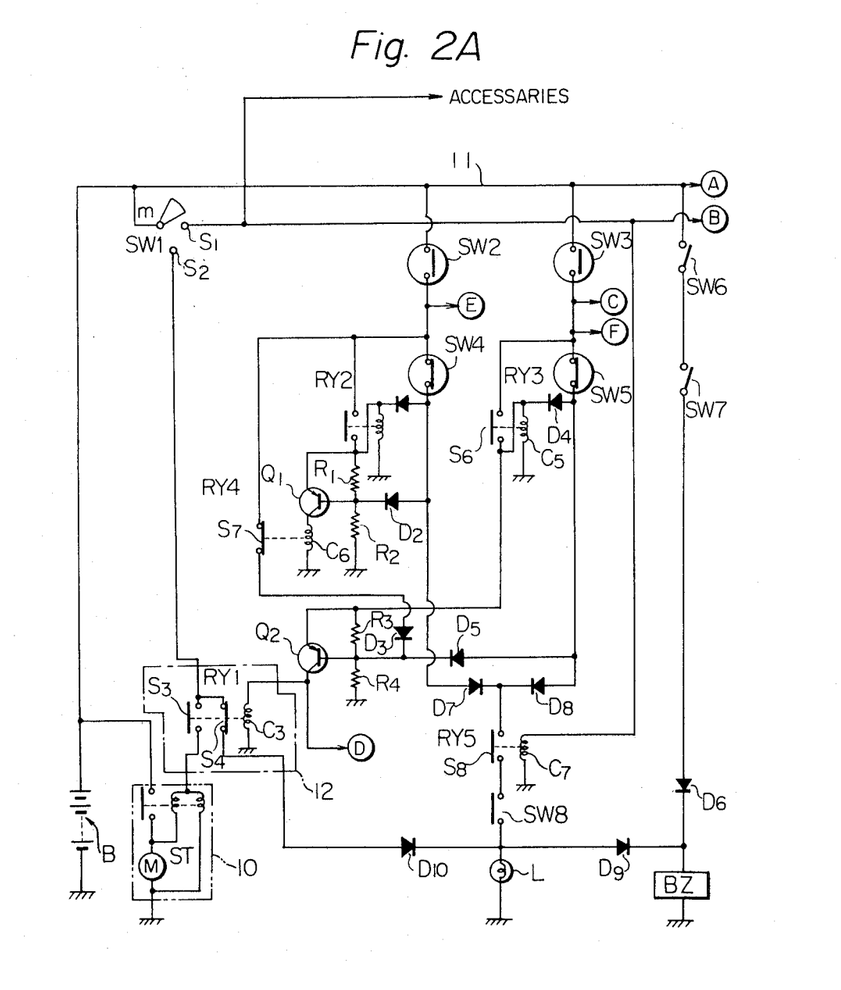
FIGS. 2A and 2B are diagrams showing a circuit arrangement of an engine start prohibition system according to the present invention.
Figure 2B:
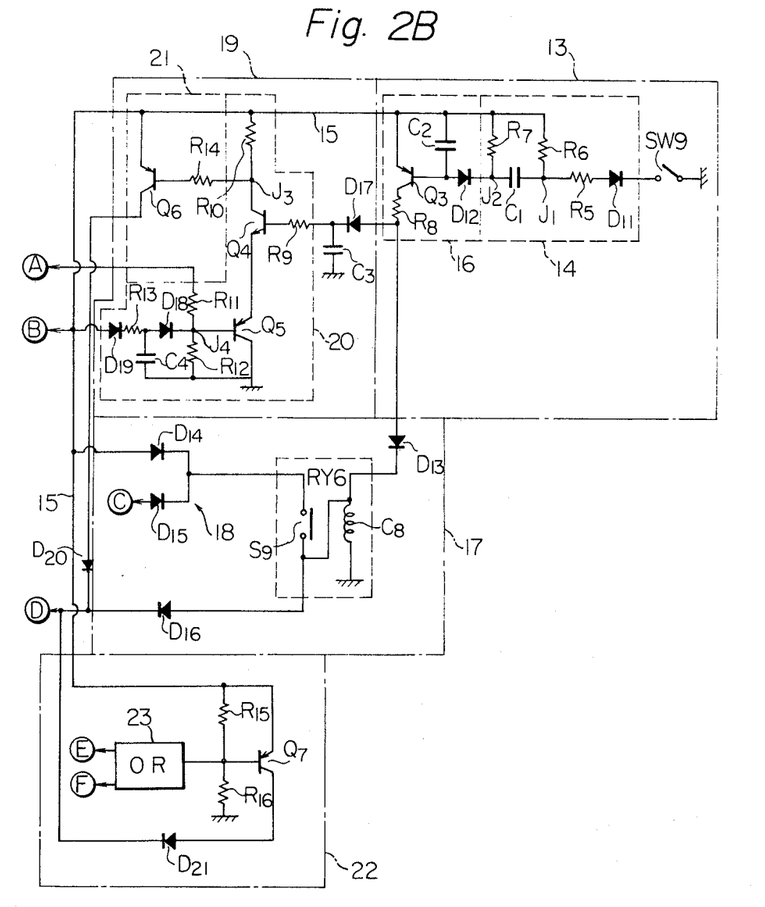

In FIGS. 2A and 2B, there is shown an engine start prohibition system according to the present invention, which comprises a new circuit arrangement shown in FIG. 2B in addition to a circuit arrangement of FIG. 2A which has the same construction as the circuit arrangement of the conventional engine start prohibition system shown in FIG. 1. Since the construction and the operation of the circuit of FIG. 1 has been explained hereinabove, the explanation of the circuit of FIG. 2A will now be omitted and only the circuit of FIG. 2B will be explained hereinbelow in connection with the circuit of FIG. 2A. The circuit of FIG. 2B includes a second energizing circuit for energizing the motor start gate circuit 12 when the engine is stopped while a person keeps seated on the operator seat. The second energizing circuit includes an integrator 13 for integrating ignition pulses generated by one point switch $SW_9$ of the point switches of the distributor. The integrator 13 includes a differentiating circuit 14 consisting of a diode $D_{11}$ having its cathode connected to one contact of the point switch $SW_9$ which is in turn grounded, a resistor $R_5$ having one terminal connected to the anode of the diode $D_{11}$, a resistor $R_6$ having its one terminal connected by way of a junction $J_1$ to the other terminal of the resistor $R_5$ and its other terminal connected to a bus line 15 which is connected to the stationary contact $s_1$ of the ignition switch $SW_1$, a capacitor $C_1$ having one terminal connected to the junction $J_1$, and a resistor $R_7$ having one terminal connected by way of a junction $J_2$ to the other terminal of the capacitor $C_1$ and its other terminal connected to the bus line 15. The integrator 13 further includes an integrating circuit 16 including a diode $D_{12}$ having its cathode connected to the junction $J_2$ of the differentiating circuit 14, a transistor $Q_3$ having its base connected to the other terminal of the anode of the diode $D_{12}$ and its emitter connected to the bus line 15, a capacitor $C_2$ bridging across the emitter and the base of the transistor $Q_3$, and a resistor $R_8$ having its one terminal connected to the collector of the transistor $Q_3$. With the above-stated arrangement, the integrator 13 produces a trigger signal as long as the point switch $SW_9$ produces the ignition pulses. The trigger signal is applied to a gate circuit 17 including a relay $RY_6$ with a relay coil $c_8$ one terminal of which is connected by way of a diode $D_{13}$ to the output of the integrator 13 and the other terminal of which is grounded. The relay $RY_6$ has a normally-open relay switch $s_9$ one contact of which is connected to the one terminal of the relay coil $c_8$. The gate circuit 17 further includes an OR gate 18 consisting of diodes $D_{14}$ and $D_{15}$, the OR gate 18 having its output terminal connected to the other contact of the relay switch $s_9$ and its input terminals respectively connected to the bus line 15 and through the switch $SW_3$ to the bus line 11. The one contact of the relay switch $s_9$ is, on the other hand, connected by way of a diode $D_{16}$ to the input terminal of the motor start gate circuit 12.

Figure 3A:
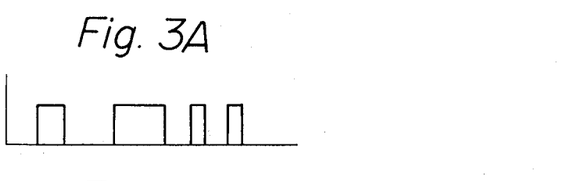
Figure 3B:
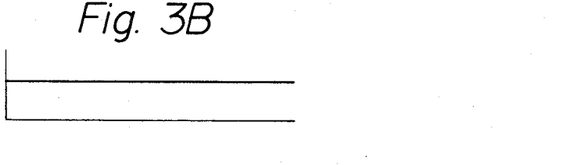
Figure 4:
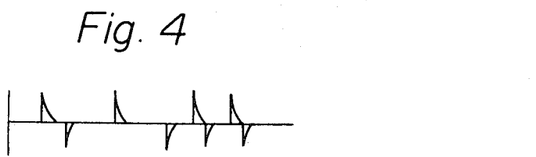

When the engine is started, the point switch $SW_9$ repeatedly interrupts its circuit, so that such a pulsating voltage as shown in FIG. 3A appear at the joint $J_1$. Thus, spike pulses appears at the joint $J_2$, having such a waveform as shown in FIG. 4A. The spike pulses integrated by the integrating circuit 16 which then produces the trigger signal having a pulse width lasting until the point switch $SW_9$ stops its interruption. When the engine is stopped, no voltage signal appear at the joint $J_1$ or otherwise a voltage signal having such a waveform as shown in FIG. 3B appears at the joint $J_1$. Thus, no signal applied to the integrating circuit 16, whereby the integrator 13 produces no signal.

Turning back to FIG. 2B, there is further illustrated a third energizing circuit 19 which includes a storage capacitor $C_3$ having its one terminal connected by way of a diode $D_{17}$ to the output terminal of the integrator 13 and its other terminal grounded. The third energizing circuit 19 further includes a discharging circuit 20 for discharging the storage capacitor $C_3$ at a predetermined rate, and a gate circuit 21 for energizing the motor start gate circuit 12 when it receives a positive voltage, that is, the preparation signal from the stationary contact $s_1$ before the storage capacitor $C_3$ is completely discharged by the discharging circuit 20. The discharging circuit 20 includes a transistor $Q_4$ having its base by way of a resistor $R_9$ to the one terminal of the capacitor $C_3$ and its collector connected by way of a junction $J_3$ to one terminal of a resistor $R_{10}$ the other terminal of which is connected to the bus line 15. The discharging circuit 20 further includes a transistor $Q_5$ having its emitter connected to the emitter of the transistor $Q_4$ and its collector grounded. The base of the transistor $Q_5$ is connected through a resistor $R_{11}$ to the bus line 11 and through a resistor $R_{12}$ to the ground. The base of the transistor $Q_5$ is further connected by way of a junction $J_4$ to the cathode of a diode $D_{18}$. The anode of the diode $D_{18}$ is grounded by way of a capacitor $C_4$ and connected through a resistor $R_{13}$ to the cathode of a diode $D_{19}$ the anode of which is connected to the bus line 15. The gate circuit 21 includes a transistor $Q_6$ having its base connected through a resistor $R_{14}$ to the joint $J_3$ and its emitter connected to the bus line 15. The collector of the transistor $Q_6$ is connected by way of a diode $D_{20}$ to the motor start gate circuit 12.

The engine start prohibition system according to the present invention further comprises a fourth energizing circuit 22 for energizing the motor start gate circuit 12 when a person is seated on either one of the operator seat and the assistant seat. The fourth energizing circuit 22 includes an OR gate 23 having its input terminals respectively connected through the switch $SW_2$ and the switch $SW_3$ to the bus line 11, and a transistor $Q_7$ having its base connected to the output terminal of the OR gate 23. The base of the transistor $Q_7$ is further connected through a resistor $R_{15}$ to the bus line 15 and through a resistor $R_{16}$ to the ground. The transistor $Q_7$ has its emitter connected direct to the bus line 15 and by way of a diode $D_{21}$ to the input terminal of the motor start gate circuit 12.

When the engine operates, the integrator 13 produces the trigger signal, so that the relay $RY_6$ is actuated by the trigger signal. When, in this instance, the preparation signal from the ignition switch $SW_1$ and/or the drive signal from the operator seat switch $SW_3$ are applied to the input terminals of the OR gate 18, the relay $RY_6$ holds by itself until both the preparation signal and the drive signal extinguish, so that the motor start gate circuit 12 is energized thereby to allow the motor start circuit 10 to be energized.

When, on the other hand, no person is seated on both of the operator seat and the assistant seat, the OR gate 23 produces no signal with the result that the transistor $Q_7$ is rendered conductive, thereby to energize the motor start gate circuit 12. This is desirable for maintenance and repair of the engine.

The storage capacitor of the third energizing circuit 19 is charged up due to the trigger signal from the integrator 13 as the engine operates. When the preparation signal lies on the bus line 15, the transistor $Q_5$ is nonconductive since the potential at the joint $J_4$ is raised by a current flowing through the diode $D_{18}$ and the resistor $R_{12}$. When the movable contact $m$ of the ignition switch $SW_1$ is disconnected from the stationary contact $s_1$ and the capacitor $C_4$ is completely discharged, the potential at the joint $J_4$ lowers thereby to cause the transistor $Q_5$ to become conductive. Thus, the storage capacitor $C_3$ is discharged gradually. When the movable contact $m$ of the ignition switch $SW_1$ is connected to the stationary contact $s_1$ before completion of discharge of the storage capacitor $C_3$, the transistor $Q_4$ and the transistor $Q_5$ become conductive, so that the transistor $Q_6$ is rendered conductive, whereby the motor start gate circuit 12 is energized by a current through the diode $D_{20}$. Thus, the cranking motor can be started when the movable contact $m$ is connected to the stationary contact while maintaining the connection with the stationary contact $s_1$. When the capacitor $C_4$ is charged up by the preparation signal on the bus line 15, the transistor $Q_5$ becomes non-conductive since the potential at the joint $J_4$ is raised thereby causing suppressing the base current of the transistor $Q_5$. When, however, the movable contact $m$ of the ignition switch $SW_1$ is connected to the stationary contact $s_1$ after completion of discharge of the capacitor $C_3$, the transistor $Q_4$ does not become conductive and accordingly the motor start gate circuit 12 is not energized.

Figure 2C:
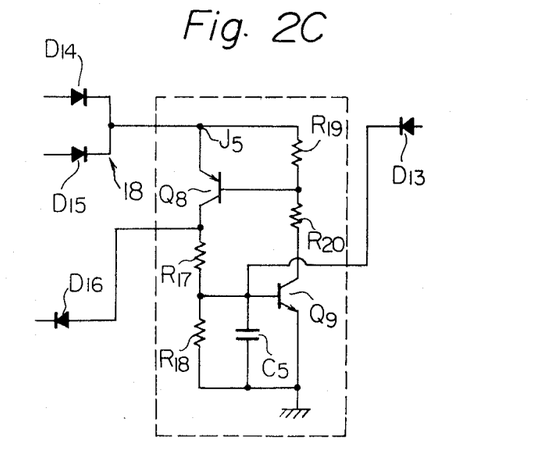
FIG. 2C is a diagram showing a modified form of a part of the circuit arrangement of FIG. 2B.

In FIG. 2C, there is shown a circuit arrangement surrounded by a broken line which may be used in stead of the circuit including the relay $RY_6$ of the gate circuit 17 of FIG. 2B. The circuit arrangement of FIG. 2C generally includes a pair of transistors $Q_8$ and $Q_9$. The transistor $Q_8$ has its emitter connected to the output terminal of the OR gate 18 by way of a junction $J_5$. The collector of the transistor $Q_8$ is connected direct to the anode of the diode $D_{16}$ and through a series connection of resistors $R_{17}$ and $R_{18}$ to the ground. The transistor $Q_9$ has its emitter grounded and its collector connected through a series connection of resistors $R_{19}$ and $R_{20}$ to the joint $J_5$. An intermediate point of the resistors $R_{19}$ and $R_{20}$ is connected to the base of the transistor $Q_8$. The collector of the transistor $Q_{is}$ is connected to an intermediate point of the resistors $R_{17}$ and $R_{18}$. A capacitor $C_5$ bridges across the base and emitter of the transistor $Q_9$. The base of the transistor $Q_9$ is connected to the cathode of the diode $D_{13}$. The operation of the circuit of FIG. 2C is substantially the same as that of the relay circuit including the relay $RY_6$.

Figure 5:
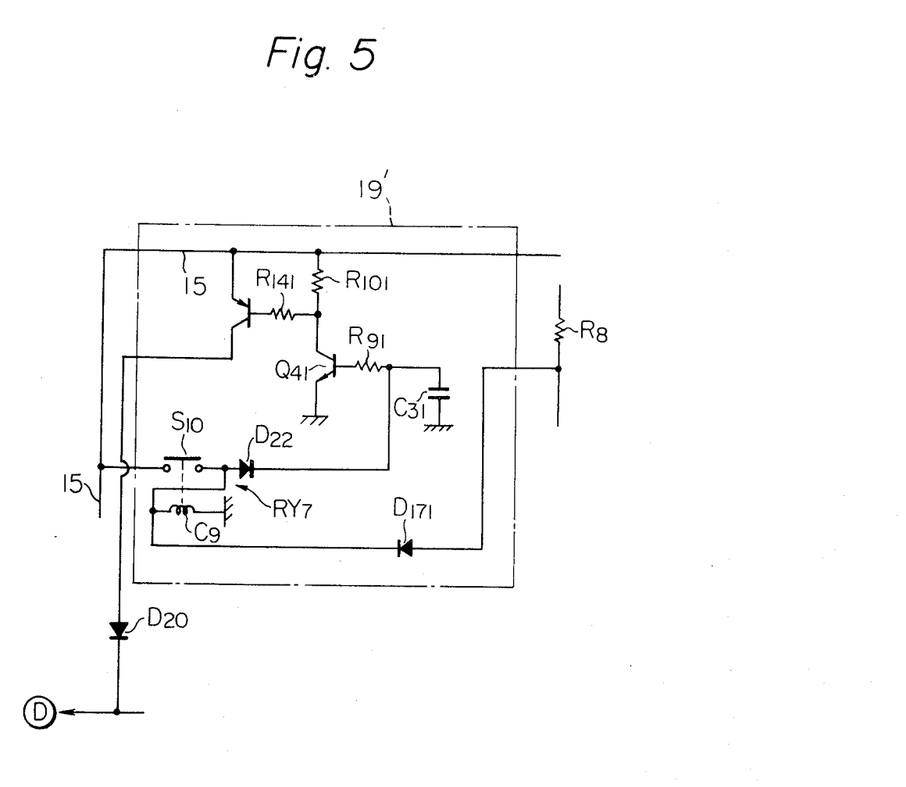
FIG. 5 is a diagram showing a modified form of a part of the circuit arrangement of FIG. 2B.

In FIG. 5, there is shown a circuit arrangement generally designated by a reference numeral 19' which may be used in stead of the third energizing circuit 19 of FIG. 2B. The circuit arrangement 19' generally includes transistors $Q_{41}$ and $Q_{61}$ and a relay $RY_7$. The transistor $Q_{41}$ has its emitter grounded and its base connected through a resistor $R_{91}$ to one terminal of a capacitor $C_{31}$ which is in turn grounded. The collector of the transistor $Q_{41}$ is connected to a resistor $R_{101}$ by way of a junction $J_6$ to the bus line 15. The transistor $Q_{61}$ has its emitter connected direct to the bus line 15 and its base connected through a resistor $R_{141}$ to the junction $J_6$. The collector of the transistor $Q_{61}$ is connected to the anode of the diode $D_{20}$. The relay $RY_7$ has a relay coil $C_9$ with one terminal connected by way of a diode $D_{171}$ to the output terminal of the integrator 13 and the other terminal grounded, and a normally-open relay switch $s_{10}$ with one contact connected by way of a diode $D_{22}$ to the one terminal of the capacitor $C_{31}$ and the other contact connected to the bus line 15.

When signal trigger signal is applied to the circuit arrangement 19', the relay $RY_7$ is actuated and holds by itself as long as the preparation signal lies on the bus line 15, whereby the capacitor $C_{31}$ is charged up. In this instance, the transistors $Q_{41}$ and $Q_{61}$ are both conductive. When, thereafter, the movable contact $m$ of the ignition switch $SW_1$ is disconnected from the stationary contact $s_1$, the preparation signal extinguishes resulting in that the relay $RY_7$ is restored, thereby to allow the charges stored in the capacitor $C_{31}$ to be gradually discharged by way of the emitter of the transistor $Q_{41}$. When the preparation signal again appears on the line 15 before completion of the discharge of the capacitor $C_{31}$, the transistors $Q_{41}$ and $Q_{61}$ become conductive, with the result that the motor start gate circuit 12 is energized thereby causing to allow the cranking motor M to start.

Figure 6A:
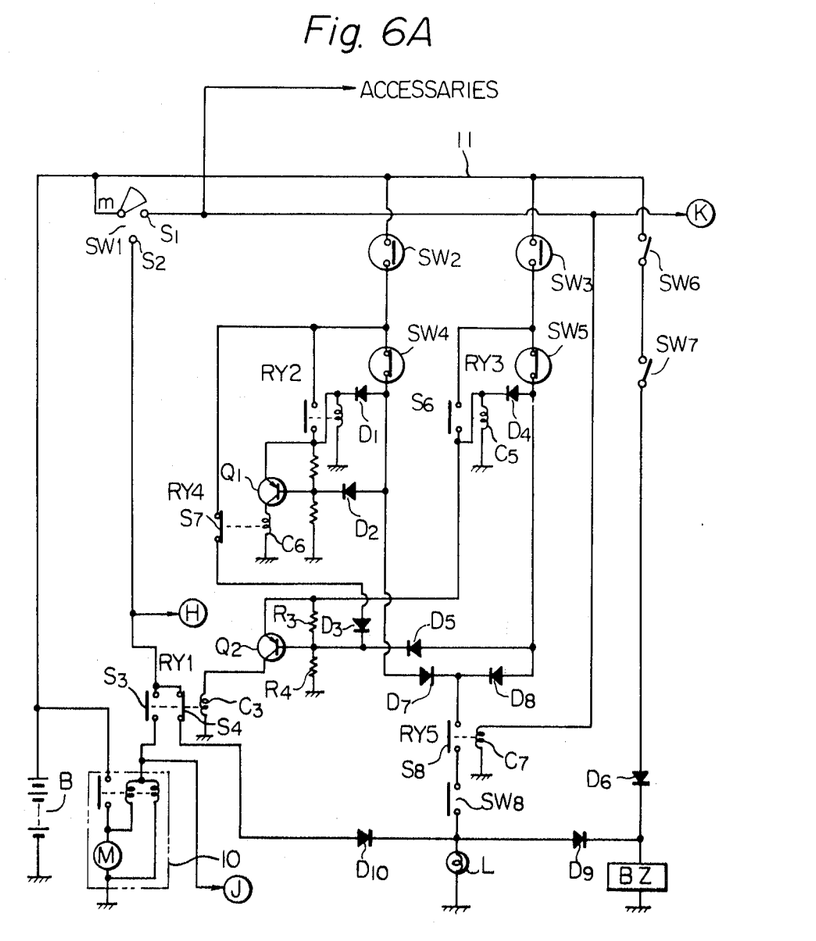
FIGS. 6A and 6B are diagrams showing a circuit arrangement of another engine start prohibition system according to the present invention.
Figure 6B:
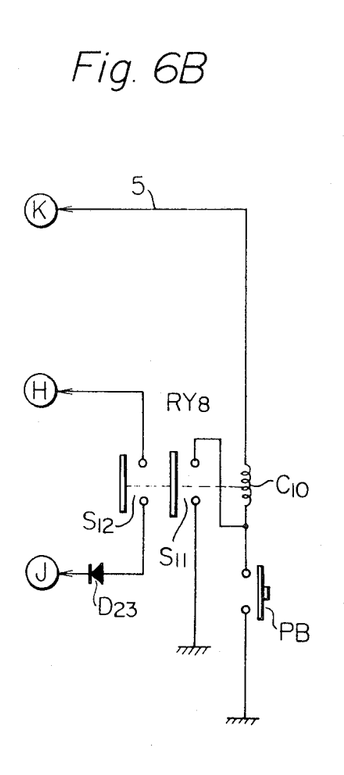

In FIGS. 6A and 6B, there is shown another embodiment of the present invention which comprises an additional motor start gate circuit shown in FIG. 6B in addition to a circuit arrangement the same as that of FIG. 2B. Since the circuit arrangement of FIG. 6A has the same construction and the operation as that of FIG. 2B, the construction and the operation of the circuit arrangement of FIG. 6A will be now omitted. The additional motor start gate circuit includes a relay $RY_8$ having a relay coil $c_{10}$ and two normally-open relay switches $s_{12}$ and $s_{11}$, and a normally-open push button PB. The relay coil $c_{10}$ has one terminal connected to the bus line 15 connected to the stationary contact $s_1$ of the ignition switch $SW_1$ and the other contact grounded by way of the push button. The relay switch $s_{11}$ has its one contact connected between the relay coil $c_{10}$ and the push button PB and its other contact grounded. The relay switch $s_{12}$ has its one contact connected to the stationary contact $s_2$ and the other contact connected by way of a diode $D_{23}$ to the input terminal of the motor start circuit 10.

When it is intended to start the cranking motor M without respect to the operation of the motor start gate circuit 12, the push button PB is actuated manually, with the result that the relay $RY_8$ holds by itself, whereby the motor start signal from the ignition switch $SW_1$ can be delivered by way of the relay switch $s_{12}$ to the motor start circuit 10. When the motor start signal extinguishes, the relay $RY_8$ is restored.

Figure 6C:
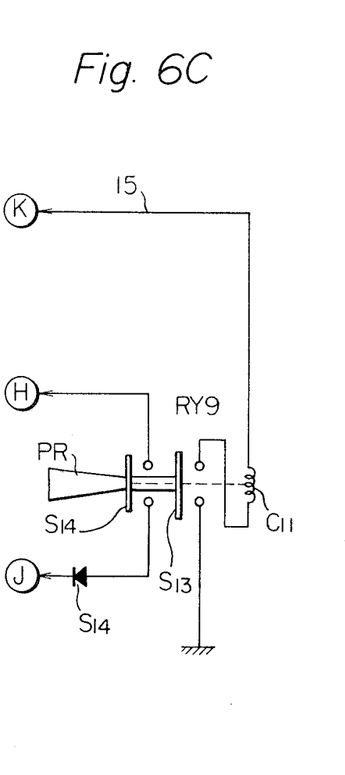
FIG. 6C is a diagram showing a modified form of a circuit arrangement of FIG. 6B.

In FIG. 6C, there is shown a modified form of the additional start gate circuit, which comprises a relay $RY_9$ with a relay coil $c_{11}$ and two normally-open relay switches $s_{13}$ and $s_{14}$. The relay coil $c_{11}$ has its one terminal connected to the bus line 15. The relay switch $s_{13}$ has its one contact connected to the other terminal of the relay coil $c_{11}$ and its other contact grounded. The relay switch $s_{14}$ has its one contact connected to the stationary contact $s_2$ of the ignition switch $SW_1$ and its other contact connected by way of a diode $D_{231}$ to the input terminal of the motor start circuit 10. The relay switches $s_{13}$ and $s_{14}$ are incorporated with a push rod PR, so that the relay switches $s_{13}$ and $s_{14}$ can be manually actuated. Since the operation of the circuit of FIG. 6C is substantially the same as that of FIG. 6B, the operation of the circuit of FIG. 6C will be now omitted.

Being apparent from the above-description, it is possible to start the cranking motor by manually triggering the additional motor start gate circuit without respect to the operation of the motor start gate circuit 12 etc.

While there has been described a preferred embodiment of the invention it will be understood that various modifications and rearrangements may be made without departing from the scope and the spirit of the invention, as defined by the appended claims.

What is claimed is:

1. An engine start prohibition system for prohibiting the engine start of a motor vehicle equipped with at least one safety harness when said at least one safety harness is not correctly set, which comprises:

ignition switch means for producing a preparation signal and a motor start signal;

motor start gate means for passing therethrough said motor start signal when energized;

first energizing means for energizing said motor start gate means when said at least one safety harness is correctly set; and second energizing means for energizing said motor start gate means when said ignition switch means produces said preparation signal during a predetermined time period after when said ignition switch means once stops to produce said preparation signal.

2. An engine start prohibition system as set forth in claim 1, in which said second energizing means includes an integrator for integrating ignition pulses generated by a point switch of the engine distributor thereby to produce a trigger signal, a storage capacitor to be charged up with said trigger signal generated by said integrator, a discharging circuit for commencing to discharge said storage capacitor at a preslected rate at a moment a predetermined time period after when said ignition switch means stops to produce said preparation signal, and a gate for energizing said motor start gate means until said storage capacitor is substantially completely discharged by said discharging circuit.

3. An engine start prohibition system as set forth in claim 1, which further comprises:

additional motor start gate means for passing therethrough said motor start signal when it is manually triggered.

4. An engine start prohibition system as set forth in claim 3, in which said ignition switch means includes an ignition switch having a movable contact connected to one terminal of a d-c power source the other terminal of which is grounded and two stationary contacts, said movable contact being connected to one of said two stationary contacts so as to produce said preparation signal and connected to the other of said two stationary contacts so as to produce said motor start signal; and said additional motor start means includes a second relay with a relay coil and two normally-open relay switches, one terminal of said relay coil being connected to said one of said two stationary contacts, one of said relay switches having its one contact connected to the other terminal of said relay coil and its other contact connected to the ground and the other of said relay switches having its one contact connected to the other of said two stationary contacts and its other contact connected to said motor start means, and a normally-open mechanical switch having its one contact connected to said the other contact of the relay coil of the second relay and its other contact grounded.

5. An engine start prohibition system as set forth in claim 3, in which said ignition switch means includes an ignition switch having a movable contact connected to one terminal of a d-c power source the other terminal of which is grounded and two stationary contacts, said movable contact being connected to one of said two stationary contacts so as to produce said preparation signal and connected to the other of said two stationary contacts so as to produce said motor start signal; and said additional motor start means includes a third relay with a relay coil and two normally-open relay switches, said relay coil having its one terminal connected to said one of said two stationary contacts, one of said two relay switches having its one contact connected to the other terminal of said relay coil and its other contact grounded, the other of said two relay switches having one contact connected to said the other of said two stationary contacts and its other contact connected to said motor start means, and means for allowing said two normally-open relay switches to be manually actuated.

* * * * *